United States Patent [19]
Saito et al.

[11] 3,953,345

[45] Apr. 27, 1976

[54] METHOD FOR THE PRODUCTION OF ACTIVATED CARBON SPHERES CONTAINING NITROGEN

[75] Inventors: Hatsuo Saito; Zenya Shiiki; Masaaki Nakao, all of Tokyo, Japan

[73] Assignees: Kureha Kagaku Kogyo Kabushiki Kaisha, Tokyo; Toyo Boseki Kabushiki Kaisha, Osaka, both of Japan

[22] Filed: May 28, 1974

[21] Appl. No.: 473,708

[30] Foreign Application Priority Data

May 29, 1973 Japan.................................. 48-59294

[52] U.S. Cl................................. 252/423; 210/40; 252/421; 252/422; 252/445; 423/244; 423/449
[51] Int. Cl.².................... C01B 31/10; C01B 31/02
[58] Field of Search ........... 252/421, 423, 445, 444; 423/445, 449

[56] References Cited

UNITED STATES PATENTS

| | | | |
|---|---|---|---|
| 3,668,110 | 6/1972 | Shea et al. ............................. | 208/45 |
| 3,775,344 | 11/1973 | Amagi et al. ......................... | 252/444 |
| 3,786,134 | 1/1974 | Amagi et al. ......................... | 423/449 |
| 3,823,221 | 7/1974 | Wakefield et al..................... | 252/421 |
| 3,917,806 | 11/1975 | Amagi et al. ......................... | 423/449 |

FOREIGN PATENTS OR APPLICATIONS

| | | | |
|---|---|---|---|
| 1,458,195 | 11/1966 | France................................. | 252/444 |

*Primary Examiner*—Winston A. Douglas
*Assistant Examiner*—P. E. Konorka
*Attorney, Agent, or Firm*—Lane, Aitken, Dunner & Ziems

[57] ABSTRACT

Spheres of activated carbon are obtained by adding to 100 parts by weight of pitch 10 to 50 parts by weight of an aromatic solvent compatible with said pitch and 2 to 50% by weight, based on the total weight of said pitch and said aromatic solvent, of a nitrogen-containing compound, melting and mixing them with one another, molding the resultant mixture in the form of spheres, removing the aromatic solvent by means of solvent extraction to convert said spheres into porous pitch spheres containing 2 to 60% by weight of nitrogen, infusibilizing the resultant micro-porous pitch spheres and thereafter activating the infusibilized pitch spheres.

17 Claims, No Drawings

METHOD FOR THE PRODUCTION OF ACTIVATED CARBON SPHERES CONTAINING NITROGEN

FIELD OF THE INVENTION

This invention relates to a method for the production of activated carbon spheres from a pitch raw material. More particularly, this invention relates to a method for the production of activated carbon spheres which function with high efficiency particularly when used for the desulfurization of a sulfur dioxide-containing combustion exhaust gas.

BACKGROUND OF THE INVENTION

In recent years attention has been directed to the prevention of pollution caused by combustion exhaust gas as containing sulfur dioxide. Combustion exhaust gas has been desulfurized, on a trial basis, by removing the sulfur dioxide using activated carbon. With this method of combustion exhaust gas desulfurization, since the sulfur dioxide contained in the combustion exhaust gas is absorbed in the form of sulfuric acid on the activated carbon, it is essential that the activated carbon to be used have both the absorbing capability unique to activated carbon and the capability of catalyzing the sulfur dioxide present in the combustion exhaust gas into sulfuric acid through a reaction with the oxygen and water present in the combustion exhaust gas and the atmosphere. The activated carbon should also possess high mechanical strength. However, the conventional activated carbon available for use in combustion exhaust gas desulfurization is generally produced by pelletizing powdered charcoal and, therefore, is lacking in mechanical strength and tends to disintegrate to a powdery form. Moreover, conventional activated carbon does not possess any appreciable catalytic activity.

Thus, a need exists for provision of activated carbon which has high mechanical strength and excellent catalytic activity.

SUMMARY OF THE INVENTION

It is, therefore, an object of this invention to provide a method for the production of activated carbon which possesses excellent catalytic activity and at the same time exhibits high mechanical strength. Other objects of the present invention will become apparent from the following description of the invention.

It has been discovered that an activated carbon satisfying the above objectives can be obtained by adding a suitable aromatic solvent and a nitrogen-containing compound to pitch, melting and mixing, molding the resulting mixture in the form of spheres, removing the aromatic solvent by solvent extraction to produce porous nitrogen-containing pitch spheres, then infusibilizing the resultant porous pitch spheres and thereafter subjecting the infusibilized spheres to an activation treatment.

More specifically, this invention is concerned with a method which is characterized by the steps of adding to 100 parts by weight of pitch, 10 to 50 parts by weight of an aromatic solvent compatible with said pitch and 2 to 50% by weight, based on the total weight of pitch and aromatic solvent, of a nitrogen-containing compound, melting and mixing the components with one another, thereafer molding the resultant mixture in the form of spheres, subsequently removing from the spheres the aromatic solvent by means of solvent extraction to converting the said spheres into porous pitch spheres containing 2 to 60% by weight of nitrogen, infusibilizing the resultant pitch spheres having micro-pores and finally activating the infusibilized spheres.

DETAILED DESCRIPTION OF THE INVENTION

The pitch to be used as the raw material for the present invention may be of a petroleum origin or a coal origin. In using a pitch which has a low softening point, however, there is a possibility that, in the course of molding the pitch mixture in the shape of spheres, the formed individual spheres will adhere to one another. To avoid this possibility, therefore, it is desirable to use a pitch of a grade which has a softening point of not less than 70°C, preferably in the range of from 70°C to 250°C, an H/C (atomic ratio) of not more than 1, preferably in the range of from 0.2 to 1.0 and a nitrobenzene-insoluble content of not more than 40%. A pitch satisfying such criteria is obtained, for example, by subjecting a petroleum hydrocarbon such as crude oil, asphalt, heavy oil, light oil, kerosene or naphtha to a heat treatment at a temperature of from 400°C to 2000°C for about 0.001 to 2 seconds to produce a tarry substance and removing low molecular components from the tarry substance by a treatment such as distillation or extraction. Pitch of a similar quality can also be obtained by first subjecting coal tar or some other tarry substance to a suitable heat treatment, followed by removing low molecular components. Alternatively, formation of such pitch can be accomplished by subjecting the waste pitch occurring as a secondary product in the oil refining operation to a heat treatment, an oxidation treatment, etc. so as to modify the pitch as required. In view of the fact that pitches of this type have heretofore been thought of as waste and have at best been found useful only as a fuel, the present invention is significant from the standpoint of effective utilization of resources.

The aromatic solvent which is added to the pitch in the production of pitch spheres in accordance with this invention must be compatible with the pitch. Use of an aromatic solvent having a boiling point in the range of from 70°C to 250°C proves to be particularly advantageous. Such an aromatic solvent is generally selected from among benzene, toluene, xylene, naphthalene, tetralin, methyl naphthalene, etc. It is particularly advantageous to use a naphthalene as the aromatic solvent. An oil fraction containing naphthalene or a BTX (benzene, toluene, xylene) fraction may also be used as the aromatic solvent.

The nitrogen-containing compound to be added to the pitch in conjunction with the aromatic solvent serves to provide a nitrogen content in the activated sphere in the range of from 2 to 60% by weight. An activated carbon having the desired catalytic activity can be produced by infusibilizing the porous pitch spheres containing nitrogen as described above and thereafter activating the infusibilized pitch spheres. The nitrogen-containing compound to be used for this invention is required to satisfy the following three conditions: (1) The compound should have a nitrogen content of not less than 10% by weight, (2) it should exhibit intimate miscibility (wetting property) with the pitch and with the aforementioned aromatic solvent and (3) it should be sparingly volatile. The nitrogen-containing compounds which satisfy these conditions and are therefore suitable for the present invention include nitrogen-containing inorganic compounds such as ammonium salts represented by ammonium phosphate and ammonium nitrate and nitrates represented by sodium nitrate and potassium nitrate; nitrogen-containing high molecular compounds such as polyacrylonitrile, polyacrylamide, melamine resin, urea resin, polyimide and protein; nitrogen-containing heterocyclic compounds such as melamine, benzoguanamine, urotropine, pyrimidine, piperazine, imidazole, benzoimidazole, quinoline, isoquinoline, indole, pyridine and their derivatives; nitrogen-containing aromatic hydrocarbon derivatives such as polyaminobenzene, polyamino-naphthalene, polynitilebenzene, polynitrosobenzene, and polynitrobenzene aliphatic amines such as 1,4-diaminobutane and hexamethylenediamine; guanidine; guanidine derivatives such as dicyandiamide; urea derivatives such as urea, dimethyl urea and N-nitrourea; semicarbazide and derivatives thereof; and nitrogen-containing alicyclic compounds such as N,N-dimethylcyclohexylamine. The aforementioned nitrogen-containing compounds are particularly advantageous from the viewpoint of intimate miscibility (or wetting property) with respect to the pitch and the aromatic solvent.

According to the present invention, the desired activated carbon spheres can be produced from the aforementioned pitch through a procedure which comprises the following steps:

1. Melting and mixing the aromatic solvent and the nitrogen-containing compound with the pitch:

The pitch, aromatic solvent and nitrogen-containing compound are mixed and heated. It is essential to add to 100 parts by weight of pitch 10 to 50 parts by weight of aromatic solvent and 2 to 50% by weight, based on the total weight of said pitch and said aromatic solvent, of nitrogen-containing compound. The desired activated carbon spheres cannot be obtained when the relative amounts of the three components fall outside the respective ranges described above. As previously mentioned, the nitrogen-containing compound serves the purpose of providing the porous pitch spheres with a nitrogen content of 2 to 60% by weight in the course of the production of activated carbon spheres. If a nitrogen-containing high molecular weight compound which is not easily extracted in the solvent extraction, is used, it suffices to add this compound in a relatively small amount within the aforementioned range. Where the nitrogen-containing compound is, for example, quinoline, pyridine or another compound which is easily extracted by the aforementioned organic solvent, it is necessary to add such a compound in a relatively large amount within said range. Where a nitrogen-containing high molecular weight compound is used, it should be in the form of finely divided particles having a particle diameter of not more than 200 μ, preferably a particle diameter of not more than 1/20 of the particle diameter of the final porous pitch spheres. Th mixing of the pitch, aromatic solvent and nitrogen-containing compound can be achieved in a satisfactory manner by use of an autoclave fitted with a stirrer or a closed kneader with heating. The melting and mixing of the components are preferably carried out at a temperature in the range of from 100°C to 200°C.

2. Molding the resultant mixture in the form of spheres:

In molding the resultant mixture in the form of spheres, any method may be employed. As disclosed by Offenlegungs-schrift 2,202,174, for example, the desired molding can be accomplished by dispersing the aforementioned molten mixture in the form of spheres under normal pressure or an imposed pressure at a temperature of from 50°C to 350°C in water containing as the suspending agent at least one water-soluble high molecular compound selected from the group consisting of partially saponified polyvinyl acetate, polyvinyl alcohol, methyl cellulose, carboxymethyl cellulose, polyacrylic acid and salts thereof, polyethylene glycol and ether derivatives thereof and ester derivatives thereof, starch and gelatin and subsequently solidifying the spheres by cooling. The molten mixture may also be converted into spheres by being introduced dropwise into a suitable liquid such as water. The formation of spheres from the molten mixture can also be effected by casting the mixture into a fixed metal die and thereafter allowing the cast mixture to cool and set in the die. From the practical point of view, the most suitable size for the spheres thus formed is in the range of particle diameters of from 0.05 to 20 mm in order that the aromatic solvent may sufficiently be removed from the spheres in the subsequent step of solvent extraction.

3. Removing the aromatic solvent from the spheres by solvent extraction:

In this step, an organic solvent which is compatible with the aromatic solvent contained in the pitch spheres of the preceding step but which lacks affinity for the pitch is employed as an extractant. The spheres are immersed in the extractant to extract the aromatic solvent and thereby produce porous pitch spheres having a nitrogen content of 2 to 60% by weight. The organic solvents which can be used for the extraction in this step include alcohols such as methanol, ethanol and propanol and paraffinic hydrocarbons such as hexane, heptane and light naphtha. The organic solvent selected should preferably be such that it selectively extracts the aforementioned aromatic solvent but extracts little or none of the nirogen-containing compound. If an organic solvent which extracts the nitrogen-containing compound is used, however, it is necessary that, the nitrogen-containing compound should be added, in step (1) in an excess amount, sufficient to allow for extraction by the organic solvent. Alternatively, a masking agent capable of preventing the nitrogen-containing compound from being dissolved out may be added, if necessary, to the aforementioned organic solvent in advance. For example, when a primary amine such as polyaminobenzene or a tertiary amine such as quinoline or pyridine is used as the nitrogen-containing compound for the purpose of the present invention, a mineral acid such as HCl or HF or an anhydrous acid such as acetic anhydride or maleic anhydride is preferably added to the aforementioned organic solvent prior to use. The added acid reacts with the primary amine or tertiary amine to produce a salt sparingly soluble in the aforementioned organic solvent and, therefore, serves the purpose of preventing said primary or tertiary amine from being extracted into said organic solvent. In extracting the aromatic solvent from the aforementioned spheres by use of the aforementioned organic solvent, the desired extraction can be accomplished by immersing the spheres in the organic solvent at a temperature of from normal room temperature to 60°C and thereafter allowing the spheres to remain immersed at rest, or with shaking as by vibrating the container or by washing the spheres by cyclically passing the solvent therethrough. Subsequently, porous pitch spheres having micro-pores and a nitrogen content of from 2 to 60% by weight are obtained by separating from the organic solvent the spheres which have been freed of the aromatic solvent.

4. Infusibilizing the resulting porous pitch spheres having a nitrogen content of 2 to 60% by weight:

The porous pitch spheres having a nitrogen content of from 2 to 60% by weight which are obtained by extraction step are infusibilized by treatment in an oxidizing aqueous solution or in an atmosphere of an oxidizing gas. Suitable oxidizing solutions for this treatment include solutions containing conventional oxidizing agents such as nitric acid, sulfuric acid, chromic acid (mixture of potassium dichromate with sulfuric acid), permanganates, hypochlorous acid or sodium hypochlorite. As the oxidizing gas, it is suitable to use air, oxygen or nitrogen oxide, a mixed gas consisting of at least two of these gases, or a mixture consisting of nitrogen and at least one of the three gases. In the infusibilizing treatment of the present invention, an aqueous oxidizing solution can be used where a nitrogen-containing high molecular weight compound such as polyacrylonitrile, urea resin, melamine resin or polyimide has been used as the nitrogen-containing compound in the aforementioned step (1). If a low molecular weight compound has been used as the nitrogen-containing compound in step (1), however, it is desirable to use an oxidizing gas because of a possibility that use of an aqueous solution will result in dissolution of the low molecular weight compound. From the economic point of view, it is most advantageous to use air in the latter case. A rotary kiln, a fluidized bed system or a moving bed system is suitable apparatus for infusibilizing the porous pitch spheres by use of the oxidizing gas. For infusibilizaton, it is most desirable to have the spheres heated from the neighborhood of normal room temperature to about 300°C at a substantially equal rate of temperature increase in order to avoid the mutual fusion (agglomeration of the individual porous pitch spheres. A reactor made of stainless steel or glass-lined walls and provided with agitating blades is suitable for use as an apparatus for infusibilizing the aforementioned porous pitch spheres with an oxidizing aqueous solution. The temperature for infusibilization with an aqueous oxidizing solution should be within the range of from 20°C to 100°C.

5. Activating the resultant infusibilized nitrogen-containing porous pitch spheres:

In this step, the infusibilized nitrogen-containing porous pitch spheres produced as described above are converted by an activation treatment into activated carbon spheres having a large inner surface area. The activation treatment involved in this step may be carried out by a conventional method. In the present invention, steam, $CO_2$, a mixed gas consisting of steam and $CO_2$, or a mixture consisting of at least one of these gases and nitrogen or oxygen is particularly suitable as the activating gas. The activation treatment is satisfactorily carried out at a temperature within the range of from 800°C to 1100°C. Particularly when steam or a mixed gas consisting predominantly of steam is used as the activating gas, a temperature in the range of from 800°C to 1000°C is advantageous for activation. When $CO_2$ or a mixed gas consisting predominantly of $CO_2$ is used as the activating gas, a temperature within the range of from 900°C to 1100°C is preferable. With regard to the apparatus for the activation treatment, a rotary kiln, a fluidized bed system or a moving bed system similar to the apparatus used for infusibilization is suitable. The activated carbon spheres which are obtained by activating the aforementioned infusibilized nitrogen-containing pitch spheres contain nitrogen and, therefore, possess good catalytic activity.

As described above, activated carbon spheres having the appearance of beads can be obtained by carrying out steps (1) through (5) sequentially in the order mentioned. These activated carbon spheres have high mechanical strength, enough to resist disintegration under conditions of normal use. Further, as will be evident from the preferred embodiments described below, they exhibit high capacity for $SO_2$ absorption as compared with the conventional activated carbon and, addition, they are easily regenerated. Thus, they prove to be particularly effective for use in desulfurization of a sulfur dioxide-containing combustion exhaust gas. Besides the application just described, they are also effective for the treatment of waste liquor from a sulfite pulp process and for deodorizing treatment and, therefore, find extensive utility in various applications.

This invention will be described more specifically with reference to the illustrative example to be cited herein below. The example is solely for illustrative purposes and is not limitative in any way of the invention.

EXAMPLE

A stainless steel autoclave having an inner volume of 5 liters, incorporating a screw type stirrer and provided at the bottom with a discharge valve was charged with 750 g of petroleum pitch {200°C softening point, nitrobenzene-insoluble content of 35% and a H/C (atomic ratio) of 0.6} separated from the tarry fraction produced by the thermal cracking of a crude oil of SERIA origin with steam at 2000°C, 250 g of industrial grade naphthalene and a given amount of a nitrogen-containing compound (indicated in Table 1). The air present in the vapor space of the autoclave was displaced with $N_2$. Thereafter, the contents of the autoclave were heated to 170°C and stirred at 100 rpm for 60 minutes for thorough melting and mixing. After the stirring, the contents were cooled to 130°C. Then, the contents in the molten state were withdrawn into a vat by opening the discharge valve at the bottom. The molten mixture was solidified by cooling to afford a solid plate-shaped mixture. A pressurized autoclave having an inner volume of 1 liter and provided with a high-speed agitator with anchor type blades was charged with 0.7 liter of aqueous 0.5% "Gosenol GH-17 (a partially saponified polyvinyl acetate type suspending agent made by Nippon Gosei K.K.)" solution and 300 g of the above solid plate-shaped mixture, with the air in the remaining space being displaced with $N_2$. Thereafter, the contents of the autoclave were heated abruptly to 180°C, maintained at this temperature for 30 minutes and subsequently stirred at 900 rpm for 30 minutes to disperse the molten mixture dispersed in the form of minute droplets. With the agitation still continuing, the contents were cooled quickly to 30°C to solidify the dispersed particles. After solidification, the contents of the autoclave were withdrawn. The particles of the mixture thus obtained were true spheres averaging 500 $\mu$ in particle diameter.

The particles of the mixture obtained as described above were immersed in n-hexane and shaken therein for 12 hours to selectively extract the naphthalene from the particles. As the naphthalene was extracted, numerous minute pores formed within the globules thus producing micro-porous spheres of pitch. A rotary kiln 100 mm in inside diameter was charged wih 100 g of the micro-porous pitch spheres. Then, with continuous introduction of a given oxidizing gas (shown in Table 1), the spheres were heated from 100°C to 300°C at a steady rate of temperature increase over 10 hours for infusibilization. Because of the minute pores distributed throughout, the spheres could be uniformly infusibilized throughout. The infusibilized nitrogen-containing pitch spheres thus produced will be referred to as "Type S" hereinafter. A stainless steel agitation tank having an inner volume of 500 ml was charged with 100 g of the micro-porous pitch spheres obtained as described above. Then, with continuous introduction of 30% nitric acid, the spheres were subjected to an infusibilization treatment at 50°C for six hours with agitation. The infusibilized nitrogen-containing pitch spheres consequently obtained will be referred to as "Type S-II" hereinafter.

A solid plate-shaped mixture obtained as described above was melted by heating to 130°C over an oil bath. The molten mixture was cast in a stainless steel mold at 130°C which consisted of one upper and one lower piece each containing hemispheres so as to produce 200 true spheres 8 mm in diameter per cycle. After the molten mixture had filled the cavities of the mold, the mold was gradually cooled to 30°C and opened by vertically separating the upper and lower pieces to remove the molded spheres. The spheres were then rolled in a rotary kiln at normal room temperature for 30 minutes to remove burrs. Truly spherical particles 8 mm in diameter were thus obtained.

These latter spheres were immersed in n-hexane and allowed to stand therein for two days to extract the naphthalene from the spheres. Using the aforementioned rotary kiln, 100 g of the spheres, after extraction of naphthalene, were rolled very slowly and heated with continuous introduction of a given oxidizing gas (shown in Table 1) from 100°C to 300°C at a rate of 10°C/hour of temperature increase for infusibilization. Consequently, there were obtained infusibilized nitrogen-containing pitch spheres about 7 mm in diameter. They will be referred to as "Type L" hereinafter. The activation of the aforementioned S, S-II and L spheres was accomplished by placing a 50-g portion of each type in a rotary kiln and heating it under continued introduction of a given activating gas (shown in Table 1). The types of infusibilized nitrogen-containing pitch spheres used and the activation conditions such as composition of activating gas, flow volume of activating gas, activation temperature, duration of activation treatment, revolution number of rotary kiln, etc. are collectively shown in Table 1. Then, each activated carbon was tested for desulfurizing capability and resistance to disintegration. The desulfurizing capability of a given activated carbon was rated by exposing the sample to a mixed gas consisting of $SO_2$, $O_2$, $H_2O$ (steam) and $N_2$ in a volumetric proportion of 2 : 6 : 10 : 82 at 100°C for three hours and determining the amount of $SO_2$ adsorbed by each sample.

The resistance to disintegration was evaluated by placing a 20-ml sample of a given activated carbon in a cylindrical glass container (28 mm in diameter × 220 mm in length), rotating the container about its longitudinal axis for ten hours on a rotary shaker operated at 36 rpm, filtering the sample through a sieve of 200 mesh, taking the weight of the portion of that sample which had passed through the sieve and calculating the proportion of the found weight against the total weight of the sample.

In Table 1, test runs Nos. 1 through 8 represent the performance data for the activated carbons produced from the pitches incorporating nitrogen-containing compounds. Those of Comparative Examples 9 and 10 represent similar data obtained with an activated carbon produced from a pitch incorporating no nitrogen-containing compound and with a commercially available molded carbon. It is clear from Table 1 that the activated carbon spheres of the present invention produced from pitches incorporating nitrogen-containing compounds surpass the comparative products in $SO_2$-absorbing capability and in resistance to disintegration.

TABLE 1 (1)

| Run No. | | Present invention | |
|---|---|---|---|
| | | 1 | 2 |
| Nitrogen-containing compound | Kind | Benzoguanamine | 1,8-diaminonaphthalene |
| | Amount added (based on total weight of pitch and aromatic solvent) | 15 | 20 |
| | Nitrogen content (% by weight based on weight of mixture) | 5.6 | 3.5 |
| Residual nitrogen content (% by weight) in micro-porous pitch spheres after solvent extraction | | 4.4 | 2.6 |
| Conditions for infusibilization | Composition of gas (voluminal ratio) | AIR | AIR |
| | Flow volume of gas (liter/minute) | 8 | 8 |
| | Composition of liquid (% by weight) | — | — |
| | Duration of infusibilization (hour) | 10 | 10 |
| | Revolution number of rotary kiln (rpm) | 30 | 30 |
| | Type of sphere | S | S |
| Conditions for activation | Composition of gas (voluminal ratio) | $H_2O/N_2$=50/50 | $H_2O/N_2$=50/50 |
| | Flow volume of gas (liter/minute) | 7 | 7 |
| | Temperature (°C) | 900 | 920 |
| | Duration of activation (hour) | 2 | 2 |
| | Revolution number of rotary kiln (rpm) | 30 | 30 |
| $SO_2$-adsorbing ability (g/100 g of activated carbon) | | 30 | 27 |
| Amount of disintegrated spheres (% by weight) | | <0.005 | < 0.005 |

TABLE 1 (2)

| Run No. | | Present invention | |
|---|---|---|---|
| | | 3 | 4 |
| Nitrogen-containing compound | Kind | Melamine resin (finely divided particles) | Polyacrylonitrile (emulsion polymer) |
| | Amount added (based on total weight of pitch and aromatic solvent) | 10 | 15 |
| | Nitrogen content (% by weight based on weight of mixture) | 2.6 | 4.0 |

TABLE 1 (2)-continued

| Run No. | | Present invention | |
|---|---|---|---|
| Residual nitrogen content (% by weight) in micro-porous pitch spheres after solvent extraction | | 3.2 | 4.8 |
| Conditions for infusibilization | Composition of gas (voluminal ratio) | AIR | — |
| | Flow volume of gas (liter/minute) | 8 | — |
| | Composition of liquid (% by weight) | — | 30%HNO$_3$ |
| | Duration of infusibilization (hour) | 10 | 6 |
| | Revolution number of rotary kiln (rpm) | 30 | — |
| | Type of sphere | S | S - II |
| Conditions for activation | Composition of gas (voluminal ratio) | CO$_2$ | H$_2$O/N$_2$=50/50 |
| | Flow volume of gas (liter/minute) | 1 | 7 |
| | Temperature (°C) | 1030 | 900 |
| | Duration of activation (hour) | 2 | 2 |
| | Revolution number of rotary kiln (rpm) | 30 | 30 |
| SO$_2$-adsorbing ability (g/100 g of activated carbon) | | 30 | 31 |
| Amount of disintegrated spheres (% by weight) | | <0.005 | <0.005 |

TABLE 1 (3)

| Run No. | | Present invention | |
|---|---|---|---|
| | | 5 | 6 |
| Nitrogen-containing compound | Kind | Dicyandiamide | Benzimidazole |
| | Amount added (based on total weight of pitch and aromatic solvent) | 10 | 15 |
| | Nitrogen content (% by weight based on weight of mixture) | 6.7 | 3.6 |
| Residual nitrogen content (% by weight) in micro-porous pitch spheres after solvent extraction | | 6.0 | 3.2 |
| Conditions for infusibilization | Composition of gas (voluminal ratio) | AIR | AIR/NO$_2$=98/2 |
| | Flow volume of gas (liter/minute) | 4 | 3.5 |
| | Composition of liquid (% by weight) | — | — |
| | Duration of infusibilization (hour) | 20 | 20 |
| | Revolution number of rotary kiln (rpm) | 15 | 15 |
| | Type of sphere | L | L |
| Conditions for activation | Composition of gas (voluminal ratio) | H$_2$O/N$_2$=50/50 | H$_2$O/N$_2$=50/50 |
| | Flow volume of gas (liter/minute) | 7 | 7 |
| | Temperature (°C) | 880 | 900 |
| | Duration of activation (hour) | 2 | 2 |
| | Revolution number of rotary kiln (rpm) | 15 | 15 |
| SO$_2$-adsorbing ability (g/100 g of activated carbon) | | 31 | 27 |
| Amount of disintegrated spheres (% by weight) | | 4 | 2 |

TABLE 1 (4)

| Run No. | | Present invention | |
|---|---|---|---|
| | | 7 | 8 |
| Nitrogen-containing compound | Kind | 1,2,4,5-tetracyanobenzene | Quinoline |
| | Amount added (based on total weight of pitch and aromatic solvent) | 10 | 40 |
| | Nitrogen content (% by weight based on weight of mixture) | 3.2 | 4.35 |
| Residual nitrogen content (% by weight) in micro-porous pitch spheres after solvent extraction | | 2.9 | 2.1 |
| Conditions for infusibilization | Composition of gas (voluminal ratio) | AIR | AIR |
| | Flow volume of gas (liter/minute) | 4 | 8 |
| | Composition of liquid (% by weight) | — | — |
| | Duration of infusibilization (hour) | 20 | 10 |
| | Revolution number of rotary kiln (rpm) | 15 | 30 |
| | Type of sphere | L | S |
| Conditions for activation | Composition of gas (voluminal ratio) | CO$_2$ | H$_2$O/N$_2$=50/50 |
| | Flow volume of gas (liter/minute) | 1 | 7 |
| | Temperature (°C) | 980 | 900 |
| | Duration of activation (hour) | 2 | 2 |
| | Revolution number of rotary kiln (rpm) | 15 | 30 |
| SO$_2$-adsorbing ability (g/100 g of activated carbon) | | 29 | 28 |
| Amount of disintegrated spheres (% by weight) | | 3 | 0.08 |

TABLE 1 (5)

| Run No. | | Comparative | |
|---|---|---|---|
| | | 9 | 10 |
| Nitrogen-containing compound | Kind | — | |
| | Amount added (based on total weight of pitch and aromatic solvent) | — | |
| | Nitrogen content (% by weight based on weight of mixture) | — | |
| Residual nitrogen content (% by weight) in micro-porous pitch spheres after solvent extraction | | — | Commercially available molded carbon for desulfurization |
| Conditions for infusibilization | Composition of gas (voluminal ratio) | AIR | |
| | Flow volume of gas (liter/minute) | 8 | |
| | Composition of liquid (% by weight) | — | |
| | Duration of infusibilization (hour) | 10 | |
| | Revolution number of rotary kiln (rpm) | 30 | |
| | Type of sphere | S | |
| Conditions for activation | Composition of gas (voluminal ratio) | H$_2$O/N$_2$=50/50 | |
| | Flow volume of gas (liter/minute) | 7 | |
| | Temperature (°C) | 900 | |
| | Duration of activation (hour) | 2 | |
| | Revolution number of rotary kiln (rpm) | 30 | |

TABLE 1(5)-continued

| Run No. | Comparative | |
|---|---|---|
| SO$_2$-adsorbing ability (g/100 g of activated carbon) | 7 | 20 |
| Amount of disintegrated spheres (% by weight) | <0.005 | 15 |

What is claimed is:

1. A method for the production of activated carbon spheres comprising:
   mixing 100 parts by weight of pitch having a softening point of not less than 70°C, an H/C ratio of not more than 1, and a nitrobenzene-insoluble content of not more than 40%, with 10–50 parts by weight of an aromatic hydrocarbon solvent compatible with the pitch and 2–50% by weight, based on the total weight of the pitch and aromatic solvent, of a nitrogen compound containing at least 10% by weight nitrogen and miscible with said pitch;
   melting the mixture;
   shaping the melted mixture into the form of spheres;
   contacting the spheres with an organic solvent which is compatible with the aromatic solvent but which lacks affinity for the pitch to extract the aromatic solvent from the spheres, thereby forming micropores in the spheres;
   contacting the microporous spheres with an aqueous or gaseous oxidizing agent to render them infusible; and
   activating the infusibilized pitch spheres with an activating gas, to form activated carbon spheres containing 2–60% by weight nitrogen.

2. The method of claim 1 wherein the activating step is effected by contacting the spheres with an activating gas at a temperature within the range of 800°C–1100°C, said activating gas being selected from steam, CO$_2$, mixtures of steam and CO$_2$, and mixtures of these gases with at least one gas selected from nitrogen and oxygen.

3. The method of claim 1 wherein said aromatic solvent is selected from benzene, toluene, xylene, naphthalene, tetralin, methyl naphthalene, naphthalene-containing oil fractions and BTX fractions.

4. The method of claim 1 wherein said nitrogen-containing compound is selected from nitrogen-containing inorganic compounds, nitrogen-containing high molecular weight compounds, nitrogen-containing heterocyclic compounds, nitrogen-containing aromatic hydrocarbon derivatives, aliphatic amines, guanidine, guanidine derivatives, urea, urea derivatives, semicarbazine and nitrogen-containing alicyclic compounds.

5. The method of claim 4 wherein said nitrogen-containing inorganic compound is selected from ammonium phosphate, ammonium nitrate, sodium nitrate and potassium nitrate.

6. The method of claim 4 wherein said nitrogen-containing high molecular weight compound is selected from polyacrylonitrile, polyacrylamide, melamine resins, urea resins, polyimides and proteins.

7. The method of claim 4 wherein said nitrogen-containing heterocyclic compound is selected from melamine, benzoguanamine, urotropin, pyrimidine, piperazine, imidazole, benzoimidazole, quinoline, isoquinoline, indole and pyridine.

8. The method of claim 4 wherein said nitrogen-containing aromatic hydrocarbon derivative is selected from polyaminobenzene, polyaminonaphthalene, polynitrilebenzene, polynitrosobenzene, and polynitrobenzene.

9. The method of claim 4 wherein said aliphatic amine is 1,4-diaminobutane or hexamethylenediamine.

10. The method of claim 4 wherein said guanidine derivative is dicyandiamide.

11. The method of claim 4 wherein said urea derivative is dimethyl urea or N-nitrourea.

12. The method of claim 4 wherein said nitrogen-containing alicyclic compound is N,N-dimethylcyclohexyl amine.

13. The method of claim 1 wherein said extracting is by contacting the spheres with an alcohol or a paraffinic hydrocarbon solvent.

14. The method of claim 13 wherein said alcohol is selected from methanol, ethanol and propanol.

15. The method of claim 13 wherein said paraffinic hydrocarbon solvent is selected from hexane, heptane and light naphtha.

16. The method of claim 2 wherein said gaseous oxidizing agent is selected from air, oxygen, nitrogen oxide, mixtures containing at least one of these gases with nitrogen, and mixtures of two or more of these gases.

17. The method of claim 1 wherein said aromatic solvent has a boiling point in the range of from 70°C to 250°C.

* * * * *